W. F. KOPKE.
MOUSETRAP.
APPLICATION FILED FEB. 4, 1920.
1,405,229.   Patented Jan. 31, 1922.
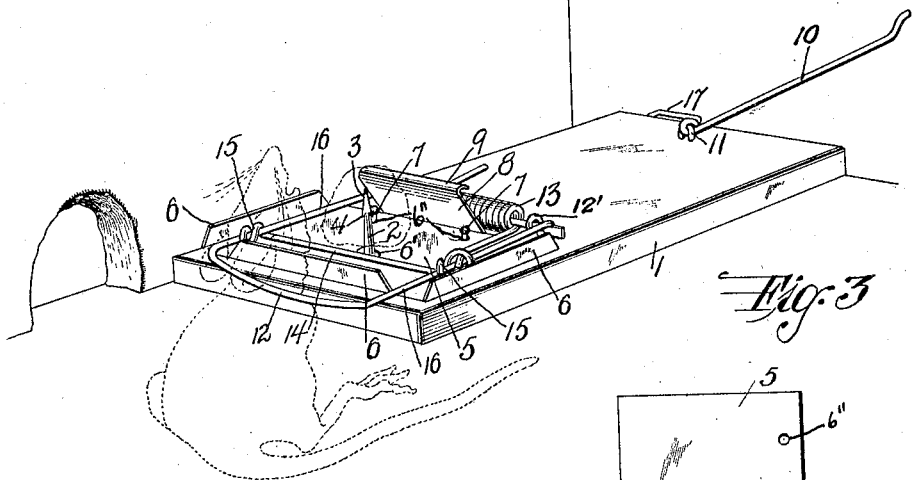
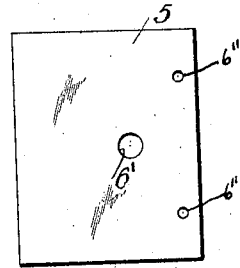
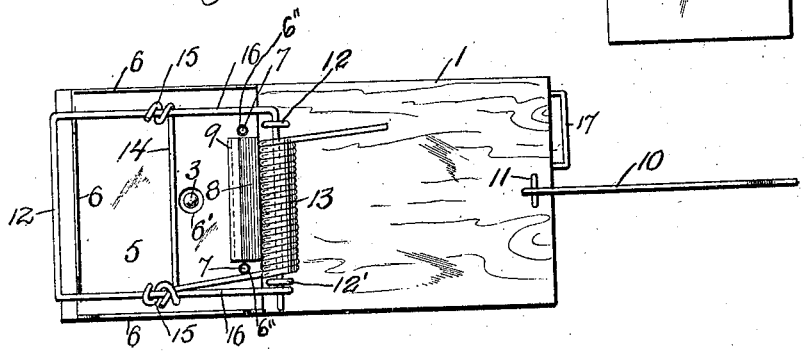
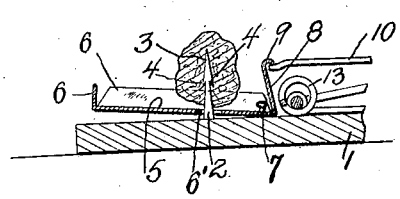
Inventor:
W. F. Kopke
By Attorney.

UNITED STATES PATENT OFFICE.

WILLIAM F. KOPKE, OF DUNDEE, MICHIGAN.

MOUSETRAP.

1,405,229. Specification of Letters Patent. Patented Jan. 31, 1922.

Application filed February 4, 1920. Serial No. 356,205.

*To all whom it may concern:*

Be it known that I, WILLIAM F. KOPKE, a citizen of the United States, residing at Dundee, in the county of Monroe and State of Michigan, have invented certain new and useful Improvements in Mousetraps; and I do hereby declare the following to be a full, clear, and exact description of the invention, such as will enable others skilled in the art to which it appertains to make and use the same, reference being had to the accompanying drawings, and to the letters and figures of reference marked thereon, which form a part of this specification.

The object of this invention is to provide a mousetrap having an enlarged plate-like trigger covering the entire front of the base of the trap, so that a rodent cannot walk over the trap without springing said trigger, thus immediately trapping the rodent; and where, by placing the trap in the trails or runways of mice or rodents, and blocking side passes they will walk over the trap and thus upon the trigger, springing the same.

By the use of the trap constructed in accordance with my invention, namely, with a large plate-like trigger, the employment of bait is unnecessary, except when the trap is placed in a situation where a rodent would not otherwise pass over it. With ordinary traps, provided with small bait triggers, rodents very often instinctively avoid the trigger, thus making the catching of the rodent by traps of ordinary construction a matter of uncertainty.

A further object is to provide a trap having a bait pin disposed independently of said plate-like trigger, that is, a stationary bait pin, and a relatively movable trigger plate, such bait pin being disposed with reference to said trigger, so that it is impossible for a mouse or other rodent to approach the bait pin without stepping upon the trigger. With a trap of ordinary construction the rodent must pull upon, or otherwise jar the trigger carrying the bait pin sufficiently to spring the trap, the mice often removing the bait gently, and thus making the catching of such mice a matter of great uncertainty.

Another object is to provide such trigger with marginal upturned flanges, constituting jaws to break the neck of the rodent when the trap is sprung.

Another object is to provide a mouse trap with a bait-holder formed in a peculiar manner, to prevent the bait being easily removed therefrom by a rodent.

Another object is to provide a mouse trap having a removable spring-controlled jaw or bail, carrying a cross piece which facilitates capture of the rodent.

The invention is clearly described in the accompanying drawings in which like reference characters identify like parts throughout the different views, and in which:

Figure 1 is a perspective view of a trap, constructed in accordance with my invention, and showing the sprung position of the parts thereof.

Figure 2 is a top plan view of said trap in its sprung position.

Figure 3 is a bottom plan view of the movable plate, and

Figure 4 is a fragmentary sectional view of the trap.

Reference now being had to the details of the drawings by numerals:

1 designates the usual base member, which may be a wooden block, and which carries a bait-pin 2, which is formed in a peculiar manner to retain the bait securely thereon against removal by a rodent. In this instance, said pin is provided with a spear-like terminal 3, the downward and outward projecting points 4, 4 thereof opposing movement of the bait in a direction to remove the same.

Upon the base member 1 is positioned a removable plate-like trigger 5, provided with an aperture 6', through which the bait-pin 2 passes. Desirably, the aperture is centrally disposed in said plate so as to be removed from the edges thereof. As shown, the plate 5 is substantially the same width as the base member 1, and is of generally rectangular form so as to provide a relatively large surface, covering substantially the entire front surface of the base 1. It will thus be seen that it is difficult for a rodent to approach the bait on the bait-pin 2, without stepping upon said plate, which constitutes a trigger, as will more fully hereinafter appear.

Said plate or trigger 5 is provided with marginal upstanding flanges 6, constituting relatively sharp projections, co-operating with the movable jaw of the trap to break the neck of the rodent when caught.

The plate or trigger 5 is provided with apertures 6'' through which pass vertical pins 7, 7 in the base member 1, and which serve to hold the trigger 5 against sidewise displacement. The trigger 5 is provided at its rear with an upwardly inclined flange 8, having at its top a rearwardly bent lip 9 for engagement with the trigger pin 10 pivotally secured to the base member 1, as by means of the eye or staple 11.

A movable jaw 12 is provided and, except as otherwise stated, is of conventional form, and is controlled, as usual, by a coiled spring 13. The movable jaw 12 is provided with a cross piece 14, which is preferably of wire, having its terminals 15 bent around the side members 16, 16 of the movable jaw 12. Staples 12' secure the movable jaw 12 to the base 1.

A staple 17 is carried by the trap and affords a convenient means for securing the trap to a stationary object, against removal or disturbance.

In use, the movable jaw 12 is swung over the flange 8 and under the trigger pin 10 which is engaged with the lip 9 of said flange, thus holding the trigger or plate 5 in an inclined position with reference to the base member 1, as shown in Figure 4. When the movable jaw 12 is thus swung, and the trigger pin 10 engaged with the lip 9, the spring 13 is tensioned, as usual. The trap is sprung by a mouse stepping upon the trigger 5, thereby disengaging the lip 9 from the trigger pin 10, and permitting the coiled spring 13 to swing the jaw 12 toward the plate or trigger 5, thereby clamping the rodent between said movable jaw 12 and the flanges 6, thus breaking the neck of the rodent.

What I claim to be new is:

A mouse trap comprising a base having staples upstanding therefrom, a pintle extending through the ears, a bowed jaw carried by the pintle, a spring embracing the pintle and having connections with the jaw and the base tending to move the jaw about the pintle, a cross-bar carried by the jaw spaced from the extreme of the bow, pins upstanding in spaced relation and spaced from the pintle, a trigger plate having perforations embracing the pins and a central perforation, a spear-like bait pin upstanding from the base through said central perforation, flanges formed upon opposite sides of the trigger plate, one of said flanges upstanding between the extreme of the bow of the jaw and the central bar, the other of said flanges carrying a lip, and a trigger pin pivoted to the base and proportioned to engage under the lip of the flange.

In testimony whereof I hereunto affix my signature.

WILLIAM F. KOPKE.